United States Patent [19]

D'Errico

[11] Patent Number: 5,427,861

[45] Date of Patent: Jun. 27, 1995

[54] LAMINATED GLAZING PANEL HAVING IMPROVED RESISTANCE TO LIGHT EXPOSURE

[75] Inventor: John J. D'Errico, Glastonbury, Conn.

[73] Assignee: Monsanto Company, St. Louis, Mo.

[21] Appl. No.: 745,137

[22] Filed: Aug. 12, 1991

[51] Int. Cl.$^6$ ............ B32B 17/06; B32B 27/42
[52] U.S. Cl. .................. 428/432; 428/437; 428/469
[58] Field of Search ........... 428/432, 437, 469, 472.2

[56] References Cited

U.S. PATENT DOCUMENTS

| | | | |
|---|---|---|---|
| 3,271,235 | 9/1966 | Lavin et al. | 502/333 |
| 4,292,372 | 9/1981 | Moynihan | 428/437 |
| 4,294,881 | 10/1981 | Meyer et al. | 428/334 |
| 4,799,745 | 1/1989 | Meyer et al. | 350/1.7 |
| 4,952,457 | 8/1990 | Cartier et al. | 428/425 |
| 5,061,568 | 10/1991 | Kessel et al. | 428/437 |

FOREIGN PATENT DOCUMENTS 0263623  4/1988  European Pat. Off.

*Primary Examiner*—D. S. Nakarani
*Attorney, Agent, or Firm*—Michael J. Murphy; Mark F. Wachter

[57] ABSTRACT

A laminated glazing panel having improved resistance to light exposure comprising: A) a glass sheet; B) an IR reflective or electrically conductive multi-layered coating on the glass sheet which includes a cap layer of $Cr_xO_y$ where $X \leq 2$ and $y \leq 5$; and C) a plasticized sheet containing polyvinyl butyral in interfacial contact with the cap layer, such sheet containing one or more carboxylic acid metal salts wherein the metal is predominantly divalent, in amount effective to control the potential level of adhesion of said plasticized sheet to another glass sheet to which it is eventually laminated; such glazing panel when laminated with said another glass sheet exhibiting pummel adhesion, measured on the side of the plasticized sheet contacting component B), of at least 3 after at least 2000 hours exposure in a Fadeometer or Weatherometer.

8 Claims, No Drawings

LAMINATED GLAZING PANEL HAVING IMPROVED RESISTANCE TO LIGHT EXPOSURE

BACKGROUND OF THE INVENTION

This invention relates to an infra red (IR) reflective and/or electrically conductive layered assembly employing a metal/dielectric stack and more particularly to such an assembly which includes an energy-absorbing plastic interlayer.

Metal/dielectric stacks in windows to reflect infrared radiation while transmitting significant visible light are well known. The effect is to reduce temperature buildup from solar radiation within an area delimited by one or more of such windows. These stacks are called interference filters and comprise at least one layer of reflective metal sandwiched between reflection-suppressing or anti-reflective dielectric layers. It is likewise known to heat the metal layer by electrical conductance to provide defrost or deice and/or defog capability. Representative structures for motor vehicle windshields are disclosed in International Publication No. W088/1230 and U.S. Pat. No. 4,799,745. Such solar screening and/or electrically conductive layered assemblies are referred to in abbreviated form hereinafter as "IR reflective coating".

When IR reflective coatings are combined with glass in laminated glazings, particularly in vehicle windshields, it is desirable to include a plasticized energy-absorbing interlayer which contains polyvinyl butyral (PVB) in the assembly to absorb a blow, e.g. from the head of an occupant, from within the vehicle without penetrating the laminate. In such laminated assemblies, the PVB layer typically abuts the top layer of the IR reflective coating.

Unfortunately, after extended periods of use the strength of the bond between the IR reflective coating and PVB layer in laminated glazings has been less then desirable. As disclosed in commonly assigned, copending application Ser. No. 7/453,556, filed Dec. 20, 1989, interfacial adhesion between the PVB layer and the abutting top layer of the IR reflective coating deteriorates after prolonged exposure to light. This is addressed in such copending application by using special cap layers in the IR reflective coating chosen for their ability to adhere well to the PVB layer. Such cap layers promote adhesion to the PVB layer and usually do not otherwise function in the optical performance of the IR reflective coating. Moreover, as disclosed for example in published European Application No. 0263623, chromium oxide is commercially popular as the top layer of an IR reflective coating for contact with the PVB layer, yet, as hereinafter more fully disclosed, prior to this invention, the chromium oxide-PVB layer bond is still not optimal.

It would be desirable to further improve the stability of the bond between a chromium oxide layer of an IR reflective coating and an abutting PVB layer in a layered solar screening and/or electrically conductive laminated glazing assembly.

SUMMARY OF THE INVENTION

Now, improvements have been made in laminated glazing assemblies which include an IR reflective layered coating which mitigate shortcomings of the prior art.

Accordingly, a principal object of this invention is to improve the performance of solar screening and/or electrically conductive assemblies in window (including windshield) applications which include a plasticized layer containing PVB.

Another object is to improve the adhesion stability between a chromium oxide layer of a metal/dielectric stack and a plasticized layer containing PVB during long term exposure to sunlight.

A further object is to enhance such long-term adhesion by modifying the formulation of the plasticized sheet.

Other objects will in part be obvious and will in part appear from the following description and claims.

These and other objects are achieved in the present invention by recognizing that chromium oxide-PVB layer adhesion after prolonged exposure to light is enhanced by eliminating or reducing a certain species of carboxylic acid metal salts typically used in the PVB sheet formulation for glass adhesion control. More specifically, a divalent, as opposed to monovalent, metal cation is used in such salts to promote such adhesion.

More specifically, there is provided a laminated glazing panel having improved resistance to light exposure comprising: A) a glass sheet; B) an IR reflective or electrically conductive multi-layered coating on the glass sheet which includes a cap layer of $Cr_xO_y$ where $X \leq 2$ and $y \leq 5$; and C) a plasticized sheet containing polyvinyl butyral in interfacial contact with the cap layer, such sheet containing one or more carboxylic acid metal salts wherein the metal is predominantly divalent, in amount effective to control the potential level of adhesion of said plasticized sheet to another glass sheet to which it is eventually laminated; said glazing panel when laminated with said another glass sheet exhibiting pummel adhesion, measured on the side of the plasticized sheet contacting component B), of at least 3 after at least 2000 hours exposure in a Fadeometer or Weatherometer.

DETAILED DESCRIPTION OF THE INVENTION

Laminated glazing panels of the type of concern have an IR reflective coating deposited directly on a flat or bent glass sheet. The PVB layer is applied against the exposed, uncovered surface of the IR reflective coating and it is the adhesion at the interface of the PVB sheet and abutting surface of the IR reflective coating which is of concern. However, to complete the glazing panel, another layer of glass (usually uncoated) must be laminated to the other side of the PVB sheet—i.e. the side not in contact with the IR reflective coating. As is well known, plasticized PVB per se adheres so strongly to glass as to be poorly effective in absorbing impact blows and consequently this high adhesion to glass is controlled (reduced) by including an effective, amount of adhesion control agent(s) in the formulation of the PVB sheet. Therefore, when desired to adjust the formulation of the PVB sheet to improve the long term bond between the PVB sheet and an IR reflective coating, the demanding requirement must simultaneously be met of establishing a bond between the other side of the PVB sheet and a glass layer which is not too strong, in order to achieve the desired impact absorption by the PVB layer.

Metal carboxylic acid salts in PVB sheet have long been known to control adhesion of the sheet to glass. See, for example, U.S. Pat. No. 3,271,235. As typically disclosed in U.S. Pat. No. 4,952,457 (col. 5, lines 12 et seq) the metal cation of such salt can be monovalent or multivalent. However, in accordance with this invention, when PVB sheet containing a metal carboxylic acid salt for glass adhesion control is also laminated (on the side opposite the side contacting the glass layer) to a chromium oxide layer of an IR reflective coating, the predominant metal cation in the sheet should be divalent. In other words, significant monovalent metal cations of metal carboxylic acid salts present in PVB sheet in laminating contact with chromium oxide deteriorate the interfacial bond between chromium oxide and the PVB sheet during prolonged exposure to light.

Accordingly, adhesion control agents operable in the formulation of the PVB sheet component of the invention are divalent metal salts of $C_1$ to $C_8$ organic, preferably aliphatic, monocarboxylic acids. Such acids can be straight chained or branched aliphatic. The divalent metal cation is preferably a member of Group II-A or II-B of the Periodic Table such as magnesium, calcium or zinc. Representative anions are acetate, butyrate, 2-ethylbutyrate, octanoate, etc. A minor amount of monovalent cation in the metal carboxylic malt formulation may be present without adverse affect on adhesion to the chromium oxide layer. Such monovalent cation, typically sodium or potassium, is present usually in the PVB resin of the sheet as a byproduct of the process employed in synthesizing the resin. For example, sodium and potassium acetate may be present from acid neutralization in the PVB resin synthesis process. The amount of such monovalent cation which can be present without adverse affect on the bond of the PVB sheet with chromium oxide is equivalent to a titer (as defined hereinafter) of up to about 10.

The amount of carboxylic acid metal salt containing predominately divalent metal cation and, if present, monovalent metal cation in minor amount in the sheet to provide the desired level of adhesion of the sheet to Glass and chromium oxide is determined by the titer of the sheet. Such titer, which includes titer attributed to that from the resin as well as to the divalent metal salt additive, should be between about 30 to 110. The carboxylic acid metal salt additive is incorporated into the sheet formulation by dispersing it in the plasticizer for the sheet.

PVB resin, processes for preparation of PVB resin, plasticizers usable with PVB resin, and processes for shaping plasticized PVB resin into sheet are well known to those skilled in the art and are more completely disclosed in U.S. Pat. No. 5,013,779, col. 3, line 23 through Col. 4, line 15, the content of which is incorporated herein by reference.

The metal/dielectric stack component is an interference filter of the Fabry-Perot type designed, principally through the appropriate selection of materials and their thicknesses to maximize (i) transmission of visible or luminous and (ii) reflection of heat-generating infrared portions (700-2125 nm) of the solar spectrum. Such stacks consist of multiple, sequentially deposited planar layers of angstroms-thick metal and dielectric coatings arranged in a predetermined sequence in face-adhering, contiguous contact with each other, as generally disclosed in U.S. Pat. Nos. 3,682,528 and 4,179,181.

The preferred dielectric stack contains one or more near IR reflecting metal layers which in operative position transmit at least 70% visible light of normal incidence measured as specified in ANSI Z26.1, this being the minimum required in the U.S. automotive industry. A somewhat lesser level is acceptable in less demanding architectural applications where a single metal layer or other more light absorbing metal/dielectric stacks may be used. Preferably visible light reflectance, normal from the surface of the stack is less than about 8%. The metal layers(s) must be separated (i.e. vertically in the thickness direction) from each other by one or more dielectric layers so reflection of visible light from the metal layer(s) interferes destructively thereby enhancing visible transmission. Usable metals comprise silver, aluminum, chromium, zinc, tin, nickel, brass, gold, stainless steel, copper, and alloys or claddings of any of the foregoing. The preferred metal is silver. Metal layer thickness should be between 60 to 200, preferably 80 to 140A.

The dielectric layer element must be essentially transparent over the visible range and at least one must exist between a pair of metal layers. Preferably a dielectric layer is on each side of a metal layer. Exemplary usable dielectric materials include $WO_3$, $In_2O_3$, $SnO_2$, ITO, $AL_2O_3$, $MgF_2$, $ZnS$, $TiO_2$ and $ZnO$.

A cap layer of chromium oxide, $Cr_xO_y$ where x is $\leq 2$ and $y \leq 5$ is the top layer of the metal/dielectric stack in contact on one side with the plasticized PVB layer and on the other side with an anti-reflective layer of the metal/dielectric stack. The values of x and y can vary depending on the amount of oxidation occurring during deposition of this cap layer. This is determined by the sputtering conditions used, e.g. deposition rate, the power level used, the presence of 100% oxygen in the sputtering chamber of an admixture of oxygen and another gas such as argon. The values of x and y or the oxidation state for any given set of deposition conditions can be determined by known ESCA (XPS) or AES analyses.

Stability of the bond between the plasticized PVB layer and the chromium oxide cap layer of the metal/dielectric stack to long term exposure to sunlight is measured by accelerated testing exposure of the solar screening assembly to a source of intense UV radiation in the form of a Fadeometer (carbon arc source), Weatherometer (xenon arc source) or equivalent system (including a QUV system) in which a large percentage of the light emitted is composed of UV radiation. Resistance of the bond to deterioration as determined by the Pummel Adhesion Test further described hereafter, is considered adequate if an assembly survives at least 2000 hours in such an accelerated exposure system. This is about equal to two years of intense sunlight exposure as might be encountered in Arizona, which in turn is representative of a longer period of exposure to less severe conditions.

The substrate of the metal/dielectric stack is a transparent rigid member such as glass. In a preferred construction, the layers of the metal/dielectric stack are sequentially magnetron sputtered on a glass layer.

The solar screening assembly can be used in any optically transparent window application. Typical applications include aircraft, locomotive and automotive windshields and architectural applications such as commercial and residential buildings. By conductively associating the metal layer(s) with a source of electrical power through the use of conventional bus bars, defrosting or defogging or deicing capability can be readily provided in the assembly.

The Pummel Adhesion Test was used to measure adhesion of the PVB layer to the chromium oxide layer of the metal/dielectric stack with which it is in contact. In such test, glass laminates containing the metal/dielectric stack on glass, and adhering plasticized PVB layer are conditioned to 0° F. (−18° C.), pummeled at constant force with a 1 pound (454 g) hammer to break the glass and all broken glass unadhered to the PVB layer removed. The amount of glass left adhered to the interlayer is visually compared to a set of standards of known pummel scale, the higher the number of the standard, the more glass remaining adhered to the interlayer—i.e. at a pummel of zero, no glass is left whereas at a pummel of 10, 100% of the interlayer surface is adhered to glass. Good impact dissipation is correlatable with a pummel adhesion value of 3 to 7, preferably 4 to 6. At less than 3, too much glass is lost on impact whereas at more than 7 adhesion is too high and impact strength is poor.

The Titer test provides a measure of the total concentration of carboxylic acid species affecting glass adhesion. Seven gm of PVB resin or sufficient plasticized PVB sheet to provide 7 gm of resin is dissolved in 250 cc of pre-neutralized methanol and titrated using an automatic titrator with 0.005 normal hydrochloric acid to a pH end point of 4.2. The titer computed from this titration is the number of ml of 0.01N hydrochloric acid required to neutralize 100 g of resin.

To determine the relative levels of monovalent and divalent (e.g. $K^+$ and $Mg^{++}$) metals in the sheet, a further analysis is carried out in the form of an inductively coupled plasma (called "ICP") which is particularly described in the "Encyclopedia of Chemical Technology" Kirk Othmer, Third Edition, John Wiley and Sons, 1984, pages 52–53.

The invention is further described in the following examples which are for illustration only and are not intended to imply any limitation or restriction on the invention.

CONTROL EXAMPLE

C1—Samples were prepared of standard float glass (30 cm by 30 cm by 0.2 cm thick) sputter coated with successive layers of zinc oxide and silver and a cap layer of $Cr_xO_y$, where x and y were as previously defined, in conventional manner to provide a solar screening assembly comprising a metal/dielectric stack of the following structural sequence and layer thicknesses: Glass/ZnO(400 A) (layer 1)/Ag(150A) (layer 2)/ZnO(400A) (layer 3) $Cr_xO_y$(20 A) (layer 4). Thirty mil (0.76 mm) thick plasticized PVB sheet was laminated to the exposed $Cr_xO_y$ layer with an additional layer of float glass laminated on the side of the PVB sheet not in contact with the $Cr_xO_y$ layer, using standard laminating conditions of 140° C., 1275 kPa. The PVB sheet contained potassium acetate which was added for glass adhesion control in an amount providing a potassium acetate titer of the sheet of 70–80. The resulting structure was representative of what would be used in a vehicle windshield. Optical properties of the assembly after lamination to the glass were:

| % Tv | % Rv | % Av | % Ts | % Rs | % As | % SR |
|------|------|------|------|------|------|------|
| 74   | 15   | 10   | 51   | 26   | 23   | 43   |

The samples were placed in a carbon arc Fadeometer with the metallized glass layer facing (closest) the light source and pummel adhesion (PA) measured with time. Results are set forth below as measured on the layer of glass of the two glass layer laminates on which the metal/metal oxide stack had been deposited. PA for the other layer of the two glass layer laminates (i.e. the glass layer in direct contact with the PVB sheet) was always acceptable at 3–6 regardless of exposure time in the Weatherometer. The PA is the number adjacent the parenthesis whereas the number in parenthesis is the number of accelerated exposure hours after which the noted PA was measured. PA less than 3 is unacceptable and such sample is listed as "F" (for "failed") followed by the number of hours of exposure before the unacceptable PA was measured.

$ZnO/Ag/ZnO/C_xO_y$ 6(0), 4(100), F(500)

The above result shows unacceptable accelerated exposure performance (failure after 500 hours) when a plasticized PVB sheet is used which contains metal carboxylic acid salt for glass adhesion control where the metal is monovalent potassium.

EXAMPLE 2

This Example is according to the invention.

The PVB sheet used was made from the following formulation:

100 parts—PVB resin having a potassium acetate titer of 1 and residual hydroxyl of 20.5% PVOH.

33 parts dihexyl adipate 0.427 parts magnesium 2-ethyl butyrate (30% aqueous solution) (952 ppm total dry solids).

The above formulation had a titer of 100. Calculations show that if the aforementioned ICP test were run on this formulation, the potassium and magnesium levels would be respectively 4 and 120 ppm.

The aqueous magnesium salt solution was dispersed in the plasticizer and the dispersion was then mixed into the resin in a high intensity mixer. The formulation was then melt shaped into 0.76 mm thick sheet.

Metal/dielectric stacks on glass with $Cr_xO_y$ as the top layer were prepared as in Example C1. Laminates with the above sheet were prepared as in Example C1 with the chromium oxide in face-adhering contact with the PVB sheet. The sequential layers of a laminate were glass/metal-dielectric stack/$Cr_xO_y$/PVB sheet/glass.

The samples were placed in a carbon arc Fadeometer with the metal/dielectric stack uppermost and facing the arc light source. PA results for the glass layer on the metal/dielectric stack side with time (below in parenthesis) were as follows:

6(0), 5(100), 4(100), 6(1000), 5(2000)

PA's on the other glass layer (i.e. the one laminated to the side of the PVB layer not in contact with $Cr_xO_y$) were at all times between 3 and 6.

The above data dramatically shows preservation of the bond at the interface between the PVB layer and a chromium oxide layer after extended 2000 hrs exposure to intense UV radiation in a Fadeometer, as evidenced by the pummel adhesion value of 5, when the metal of a metal carboxylic acid glass adhesion control agent in the PVB sheet was predominantly divalent as magnesium.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. A laminated glazing panel having improved resistance to light exposure comprising:

A) a glass sheet;

B) an IR reflective or electrically conductive multilayered coating on the glass sheet which includes a cap layer of $Cr_xO_y$ where $X \leq 2$ and $y \leq 5$; and C) a plasticized sheet containing polyvinyl butyral in interfacial contact with the cap layer, said sheet, containing one or more carboxylic acid metal salts wherein the metal is predominantly divalent, in amount effective to control the potential level of adhesion of said plasticized sheet to another glass sheet to which it is eventually laminated;

said glazing panel when laminated with said another glass sheet exhibiting pummel adhesion, measured on the side of the plasticized sheet contacting component B), of at least 3 after at least 2000 hours exposure in a Fadeometer or Weatherometer.

2. The panel of claim 1 wherein the polyvinyl butyral of component C) before inclusion in said sheet had a monovalent metal carboxylic acid titer of 0 to 10.

3. The panel of claim 2 wherein the formulation of said sheet had a divalent metal carboxylic acid titer of about 30 to 110.

4. The panel of claim 3 wherein the plasticizer in component C) comprises $C_6$–$C_8$ adipate ester.

5. The panel of claim 4 wherein the plasticizer comprises hexyl adipate.

6. The panel of any of claims 1, 2, 3, 4 or 5 wherein the one or more carboxylic acid metal salts wherein the metal is predominantly divalent comprises magnesium 2-ethyl butyrate.

7. The panel of claim 6 wherein said another glass sheet is laminated to the plasticized sheet.

8. The panel of claim 7 wherein the pummel adhesion measured on the side of the plasticized sheet not in contact with component B) is between 3 to 6.

* * * * *